US011669926B2

(12) United States Patent
Futakami et al.

(10) Patent No.: US 11,669,926 B2
(45) Date of Patent: Jun. 6, 2023

(54) INFORMATION PROVISION DEVICE, LOADING WORK ASSISTANCE SYSTEM, AND INFORMATION PROVISION METHOD

(71) Applicant: Komatsu Ltd., Tokyo (JP)

(72) Inventors: Masanao Futakami, Tokyo (JP); Shinya Komori, Tokyo (JP)

(73) Assignee: Komatsu Ltd., Tokyo (JP)

( * ) Notice: Subject to any disclaimer, the term of this patent is extended or adjusted under 35 U.S.C. 154(b) by 466 days.

(21) Appl. No.: 16/606,792

(22) PCT Filed: Sep. 6, 2018

(86) PCT No.: PCT/JP2018/033070
§ 371 (c)(1),
(2) Date: Oct. 21, 2019

(87) PCT Pub. No.: WO2019/092965
PCT Pub. Date: May 16, 2019

(65) Prior Publication Data
US 2020/0380628 A1 Dec. 3, 2020

(30) Foreign Application Priority Data
Nov. 9, 2017 (JP) .............................. JP2017-216624

(51) Int. Cl.
*G06Q 50/28* (2012.01)
*B60W 30/18* (2012.01)
(Continued)

(52) U.S. Cl.
CPC ....... *G06Q 50/28* (2013.01); *B60W 30/18054* (2013.01); *E02F 9/2054* (2013.01); *E02F 9/267* (2013.01); *G06Q 10/0631* (2013.01)

(58) Field of Classification Search
CPC . B60W 30/18054; E02F 9/2054; E02F 9/267; G06Q 10/0631; G06Q 10/06313;
(Continued)

(56) References Cited

U.S. PATENT DOCUMENTS

| 4,831,539 A | 5/1989 | Hagenbuch | |
| 5,546,093 A * | 8/1996 | Gudat | G01S 19/53 |
| | | | 701/25 |

(Continued)

FOREIGN PATENT DOCUMENTS

| CN | 101064016 A | 10/2007 |
| CN | 102602318 A | 7/2012 |

(Continued)

*Primary Examiner* — Tyler J Lee
(74) *Attorney, Agent, or Firm* — Locke Lord LLP

(57) ABSTRACT

A loading work assistance system includes a loading-progress-degree calculation unit that calculates a degree of progress of loading work performed on a transport vehicle located in a construction site by a loading vehicle, a determination unit that determines whether or not the degree of progress is equal to or more than a degree-of-progress determination threshold value, and a transport vehicle starting instruction unit that instructs the transport vehicle standing by to be started in a case where the degree of progress is equal to or more than the degree-of-progress determination threshold value.

8 Claims, 9 Drawing Sheets

(51) Int. Cl.
*G06Q 10/06* (2023.01)
*G06Q 10/0631* (2023.01)
*E02F 9/20* (2006.01)
*E02F 9/26* (2006.01)

(58) Field of Classification Search
CPC ...... G06Q 10/083; G06Q 50/08; G06Q 50/28; G06Q 50/30
See application file for complete search history.

(56) References Cited

U.S. PATENT DOCUMENTS

| | | | | |
|---|---|---|---|---|
| 5,586,030 | A * | 12/1996 | Kemner | G05D 1/0297 |
| | | | | 701/23 |
| 5,787,378 | A * | 7/1998 | Schricker | F16H 61/12 |
| | | | | 701/50 |
| 5,925,081 | A | 7/1999 | Hawkins et al. | |
| 5,961,560 | A | 10/1999 | Kemner | |
| 6,246,932 | B1 * | 6/2001 | Kageyama | G05D 1/0297 |
| | | | | 340/992 |
| 6,484,078 | B1 * | 11/2002 | Kageyama | G05D 1/0297 |
| | | | | 340/989 |
| 6,988,591 | B2 * | 1/2006 | Uranaka | E21C 41/26 |
| | | | | 187/247 |
| 8,548,668 | B2 * | 10/2013 | Everett | E02F 9/265 |
| | | | | 701/24 |
| 8,626,541 | B2 * | 1/2014 | Doan | G06Q 10/06311 |
| | | | | 705/7.11 |
| 8,843,311 | B2 * | 9/2014 | Takeda | E02F 9/205 |
| | | | | 701/468 |
| 8,868,302 | B2 * | 10/2014 | Everett | G05D 1/0291 |
| | | | | 701/50 |
| 8,930,043 | B2 * | 1/2015 | Everett | E02F 9/2045 |
| | | | | 701/2 |
| 8,983,707 | B2 * | 3/2015 | Everett | G05D 1/0291 |
| | | | | 701/24 |
| 9,243,923 | B2 * | 1/2016 | Sugihara | G01C 21/3407 |
| 9,383,754 | B2 * | 7/2016 | Takeda | G05D 1/0278 |
| 10,373,274 | B2 * | 8/2019 | Takeda | G06Q 10/06312 |
| 2004/0040792 | A1 | 3/2004 | Uranaka et al. | |
| 2014/0231153 | A1 | 8/2014 | Fukasu et al. | |

FOREIGN PATENT DOCUMENTS

| | | |
|---|---|---|
| CN | 103249896 A | 8/2013 |
| JP | 2000-142983 A | 5/2000 |
| JP | 2004-102322 A | 4/2004 |
| JP | 2009-286624 A | 12/2009 |
| JP | 2010-089633 A | 4/2010 |
| JP | 2014-137690 A | 7/2014 |

* cited by examiner

FIG. 9

<LOADING START INFORMATION>

| WORK EQUIPMENT ID | PC001 |
|---|---|
| TRANSPORT VEHICLE ID | DUMP01 |
| PROGRESS | "START" |
| LOAD ACCUMULATED VALUE | – |
| DATE AND TIME | YYYY/MM/DD hh:mm:ss |

<LOADING INTERMEDIATE INFORMATION>

| WORK EQUIPMENT ID | PC001 |
|---|---|
| TRANSPORT VEHICLE ID | DUMP01 |
| PROGRESS | "INTERMEDIATE" |
| LOAD ACCUMULATED VALUE | 7950kg |
| DATE AND TIME | YYYY/MM/DD hh:mm:ss |

<LOADING COMPLETION INFORMATION>

| WORK EQUIPMENT ID | PC001 |
|---|---|
| TRANSPORT VEHICLE ID | DUMP01 |
| PROGRESS | "COMPLETE" |
| LOAD ACCUMULATED VALUE | 9840kg |
| DATE AND TIME | YYYY/MM/DD hh:mm:ss |

INFORMATION PROVISION DEVICE, LOADING WORK ASSISTANCE SYSTEM, AND INFORMATION PROVISION METHOD

TECHNICAL FIELD

The present invention relates to an information provision device, a loading work assistance system, and an information provision method.

Priority is claimed on Japanese Patent Application No. 2017-216624, filed on Nov. 9, 2017, the content of which is incorporated herein by reference.

BACKGROUND ART

PTL 1 discloses a work amount monitoring system reliably preventing excessive throwing of cargo to a transport vehicle from a work machine.

According to the work monitoring system, a controller detects a bucket-out operation signal for operating a bucket of a hydraulic excavator outwards and can automatically recognize loading work onto a transport vehicle from the bucket in a case where a loading load value is reduced under the bucket-out operation signal for a predetermined time or more. The controller can automatically integrate a difference between a loading load value right before the bucket-output operation and the smallest load value after the bucket-output operation as the current load value, and can thus prevent an erroneous manual integration operation of an operator of the heat exchanger. Since a load value difference before and after cargo is discharged from the bucket is detected and accumulated, an accurate load capacity can be accumulated even in a case where part of the cargo remains in the bucket.

CITATION LIST

Patent Literature

[PTL 1] Japanese Unexamined Patent Application, First Publication No. 2010-089633

SUMMARY OF INVENTION

Technical Problem

As one piece of work performed in a normal construction site or the like, there is loading work of a transport object onto a transport vehicle such as a dump truck from a loading vehicle such as a hydraulic excavator. The transport vehicle leaves the construction site in a state of being loaded with the transport object within a range not exceeding a prescribed maximum load capacity, and a new transport vehicle replacing the transport vehicle arrives under the loading vehicle.

It is desirable to further improve operation efficiency of a loading vehicle and a transport vehicle related to the loading work.

The present invention is directed to providing an information provision device, a loading work assistance system, and an information provision method capable of improving operation efficiency of a loading vehicle and a transport vehicle related to loading work.

Solution to Problem

According to one aspect of the present invention, there is provided a loading work assistance system which gives an instruction to a transport vehicle standing by on the basis of information regarding loading work performed on a transport vehicle located in a construction site by a loading vehicle, the loading work assistance system including a loading-progress-degree calculation unit that calculates a degree of progress of the loading work performed on the transport vehicle located in the construction site by the loading vehicle; a determination unit that determines whether or not the degree of progress is equal to or more than a degree-of-progress determination threshold value; and a transport vehicle starting instruction unit that instructs the transport vehicle standing by to be started in a case where the degree of progress is equal to or more than the degree-of-progress determination threshold value.

Advantageous Effects of Invention

According to the aspects, it is possible to improve operation efficiency of a loading vehicle and a transport vehicle related to loading work.

BRIEF DESCRIPTION OF DRAWINGS

FIG. 9 is a diagram showing configuration examples of loading start information, loading intermediate information, and loading completion information according to the first embodiment.

DESCRIPTION OF EMBODIMENTS

First Embodiment

Hereinafter, a loading work assistance system according to a first embodiment will be described in detail with reference to FIGS. 1 to 10.

(Overall Configuration of Work Assistance System)

Figure 1:
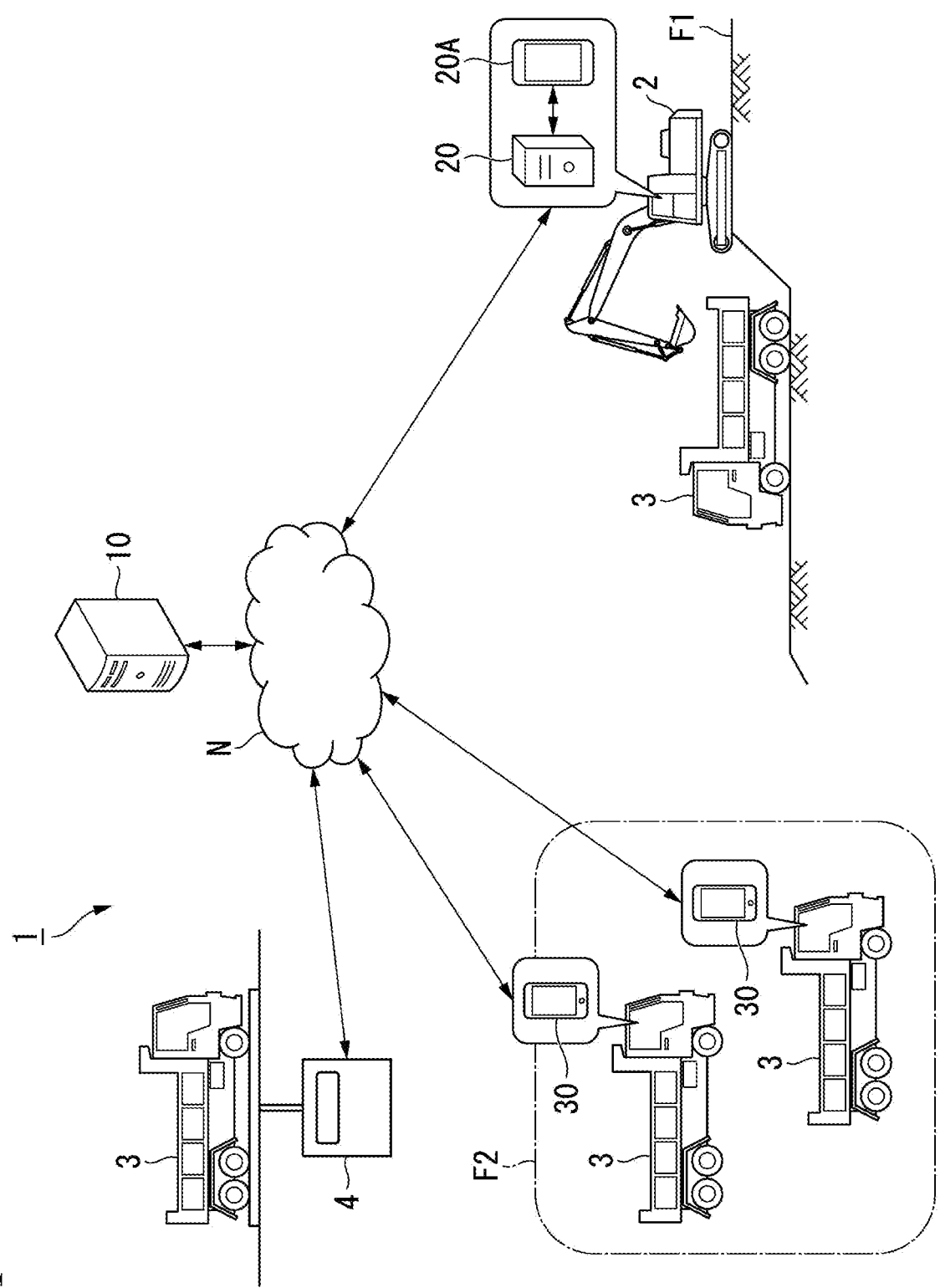
FIG. 1 is a schematic diagram showing the overall configuration of a loading work assistance system according to a first embodiment.

FIG. 1 is a diagram showing the overall configuration of a loading work assistance system according to the first embodiment.

In FIG. 1, loading work is performed in order to discharge earth and sand, gravel, or the like generated due to construction work in a construction site F1. The loading work is work of loading earth and sand, gravel, or the like onto a transport vehicle 3 by using a loading vehicle 2. Hereinafter, the earth and sand, the gravel, or the like will be referred to as a transport object. Here, the loading vehicle 2 is, for example, a hydraulic excavator. The transport vehicle 3 is a vehicle provided with a vessel on which loading is performed, and is, for example, a dump truck.

In the present embodiment, the loading vehicle 2 will be described to be a hydraulic excavator, but is not limited to this aspect in other embodiments. The loading vehicle 2 may be, for example, a wheel loader.

In a standby place F2, a plurality of transport vehicles 3 allocated to the loading work in the construction site F1 stand by. The maximum load capacity is defined for each of the transport vehicles 3. From the viewpoint of operation efficiency of the loading work, typically, the transport vehicle 3 is loaded with a transport object in a range not exceeding the maximum load capacity and close to the range, and then leaves the construction site F1. The transport vehicle 3 standing by in the standby place F2 starts toward the construction site F1 in a predetermined stage, and replaces the transport vehicle 3 having completed the loading work, and thus the loading work is continuously performed.

In the present embodiment, it is assumed that the standby place F2 is present at a location which is different from the construction site F1 due to locational restrictions. Here, the locational restrictions are restrictions that, for example, a space where the transport vehicles 3 other than the transport vehicle 3 during loading work are standing by cannot be secured in the construction site F1. However, an application scope of a loading work assistance system 1 is not limited to the above condition.

The standby place F2 according to the present embodiment may be, for example, a dedicated parking space provided at a location which is different from the construction site F1, but is not limited to this aspect in other embodiments. In other embodiments, the standby place F2 may be, for example, a roadway, and a case where the transport vehicle 3 is traveling on the standby place F2 which is a roadway is also assumed to be included in a state of standing by in the standby place F2.

As shown in FIG. 1, the loading work assistance system 1 includes a server device 10, an information provision device 20, and a vehicle weight meter 4.

The server device 10 exchanges information with the information provision device 20 mounted on the loading vehicle 2 and a terminal device 30 carried by a driver of the transport vehicle 3 via a wide area network N such as the Internet. The server device 10 may be in an aspect of being provided in an office of the construction site F1, and may be in an aspect of provided at a location which is different from the construction site F1.

The information provision device 20 is mounted on the loading vehicle 2. The information provision device 20 generally detects a loading operation of the loading vehicle 2 and transmits information indicating the progress of loading work performed on the transport vehicle 3 to the server device 10 which is an external device. Here, the external device in the present embodiment is a device provided outside the loading vehicle 2. The information provision device 20 is communicably connected to a terminal device 20A carried by an operator riding the loading vehicle 2 in a wired or wireless manner. The information provision device 20 may receive various input operations of the operator, or may present various pieces of information to the operator, via the terminal device 20A.

The terminal device 20A carried by the operator of the loading vehicle 2 is, for example, a tablet terminal. The terminal device 20A is portable and has general functions such as an input function, a display function, and a communication function.

The terminal device 30 carried by the driver of the transport vehicle 3 is, for example, a smart phone. The terminal device 30 is portable, has general functions such as an input function, a display function, a communication function, and a position information acquisition function, and is individually identifiable by identification information such as a mobile phone number. The server device 10 correlates a transport vehicle ID of the transport vehicle 3 with identification information of the terminal device 30, and thus position information indicated by the terminal device 30 may be regarded as the current position of the transport vehicle 3.

The terminal device 20A and the terminal device 30 according to the present embodiment have been described to be a portable table terminal and smart phone, but are not limited to this aspect in other embodiments. In other words, the terminal device 20A and the terminal device 30 may be respectively on-vehicle stationary terminals fixed to the loading vehicle 2 and the transport vehicle 3. In a case where the terminal device 20A and the terminal device 30 are stationary terminals, the terminal device 20A and the terminal device 30 may be provided with input buttons which are external input mechanisms.

The vehicle weight meter 4 measures a total weight of the transport vehicle 3 getting on a weighbridge. The vehicle weight meter 4 transmits an original load amount of the transport vehicle 3 of which a total weight is measured, to the server device 10 in association with a transport vehicle ID of the transport vehicle 3. The original load amount is a weight of a loaded object which is loaded on the transport vehicle 3 at the measurement time. The vehicle weight meter 4 calculates the original capacity by subtracting a weight of the vehicle body only from a measurement result of the total weight. Here, the weight of the vehicle body only is a prescribed value indicating a weight of a transport vehicle not loaded with a loaded object or a heavy object.

It is assumed that the vehicle weight meter 4 is provided, for example, at an entrance of the construction site F1 or the standby place F2, and an original load amount of the transport vehicle 3 at the time at which the transport vehicle arrives at the construction site F1. It is assumed that a transport vehicle information acquisition unit 200 of the information provision device 20 regularly acquires and updates transport vehicle information, and thus acquires the transport vehicle information in which the latest original load amount is acquired at all times. Here, a cycle of update of the transport vehicle information is, for example, once every 15 seconds.

(Configuration of Loading Vehicle)

A description will be made of a configuration of the loading vehicle 2. The loading vehicle 2 includes a traveling body, an upper slewing body, and a work equipment provided on the upper slewing body and contributing to loading. The work equipment is a set of a boom, an arm, and a bucket. The upper slewing body is provided with a driver seat and the boom. The arm is attached to the boom. The bucket is attached to the arm. Each of the upper slewing body and the boom is attached with a boom cylinder. The boom can be operated with respect to the upper slewing body by driving the boom cylinder. Each of the boom and the arm is attached with an arm cylinder. The arm can be operated with respect to the boom by driving the arm cylinder. Each of the arm and the bucket is attached with a bucket cylinder. The bucket can be operated with respect to the arm by driving the bucket cylinder. The slewing body is provided with a GPS antenna used to acquire position information.

The loading vehicle 2 receives operations on the work equipment and the slewing body with right and left cross levers of the driver seat. An operator may perform respective operations such as boom lift-up and down by operating the right lever in the front-rear direction. The operator may perform bucket excavation/dumping by operating the right lever in the leftward-rightward direction. The operator may perform arm excavation/dumping by operating the left lever in the front-rear direction. The operator may perform right and left slewing operations by operating the left lever in the leftward-rightward direction.

The information provision device 20 detects drive states (cylinder strokes and the like) of various drive members provided in the work equipment, and thus calculates a pose angle of the work equipment. The loading vehicle 2 calculates a load of a transport object held in the bucket on the basis of a detection result which is detected with cylinder pressure such as pressure of the boom cylinder provided in the work equipment. The loading vehicle 2 has a function of calculating respective parameters such as a bucket height or a load by using sensor detection values such as a cylinder stroke or boom cylinder pressure.

<Functional Configuration of Server Device>

Figure 2:
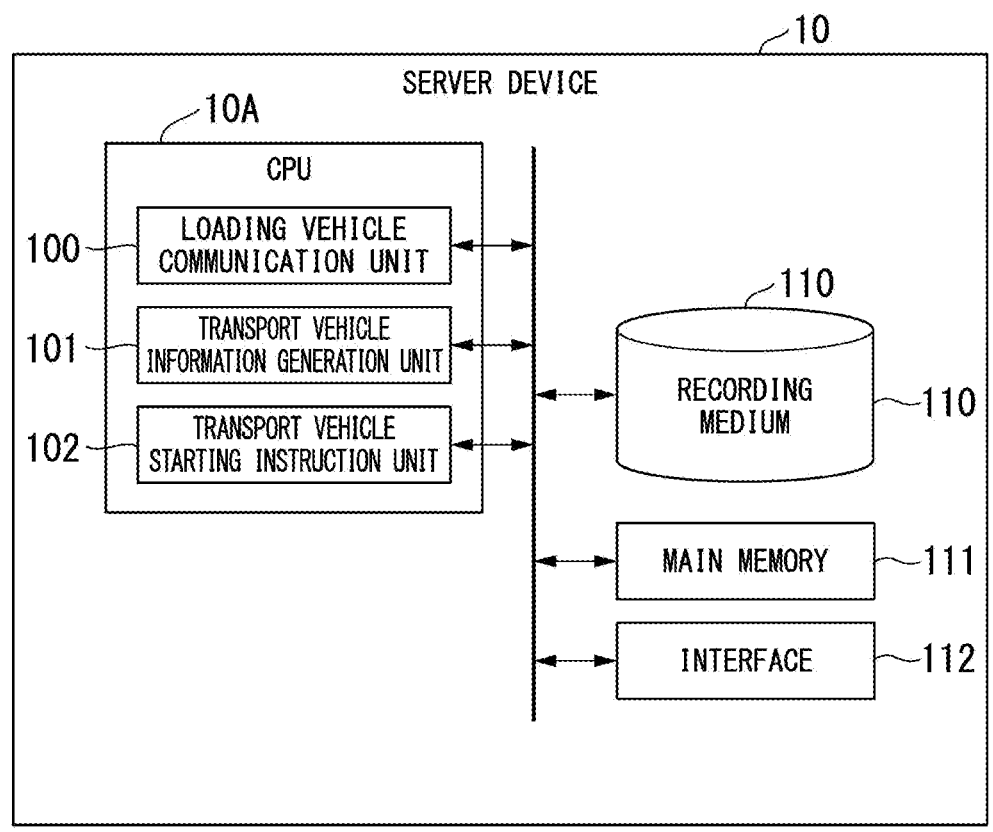
FIG. 2 is a diagram showing a functional configuration of a server device according to the first embodiment.

FIG. 2 is a diagram showing a functional configuration of the server device according to the first embodiment.

As shown in FIG. 2, the server device 10 includes a CPU 10A, a recording medium 110, a main memory 111, and an interface 112.

The main memory 111 is a volatile memory (RAM) used as a work area of the CPU 10A. The interface 112 is a communication interface used to exchange information between the information provision device 20 and the terminal device 30.

The recording medium 110 is a large capacity recording device built into the server device 10, and is, for example, a hard disk drive (HDD) or a nonvolatile memory.

The CPU 10A operates according to a program loaded into the main memory 111, and thus functions as a loading vehicle communication unit 100, a transport vehicle information generation unit 101, and a transport vehicle starting instruction unit 102.

The loading vehicle communication unit 100 performs transmission and reception of various pieces of information with the information provision device 20 (FIG. 1) mounted on the loading vehicle 2.

The transport vehicle information generation unit 101 generates transport vehicle information (described later) in response to request information received from the information provision device 20 of the loading vehicle 2.

In a case where loading intermediate information (described later) which is predetermined information indicating the progress of loading work is received from the information provision device 20, the transport vehicle starting instruction unit 102 gives an instruction for starting toward the loading vehicle 2 of the construction site F1 to the terminal device 30 owned by the driver of the transport vehicle 3 which is standing by in the standby place F2 and on which the next loading is performed.

Information group regarding the loading vehicle 2 and the transport vehicle 3 allocated to loading work in the construction site F1 is recorded on the recording medium 110 in advance.

<Functional Configuration of Information Provision Device>

Figure 3:
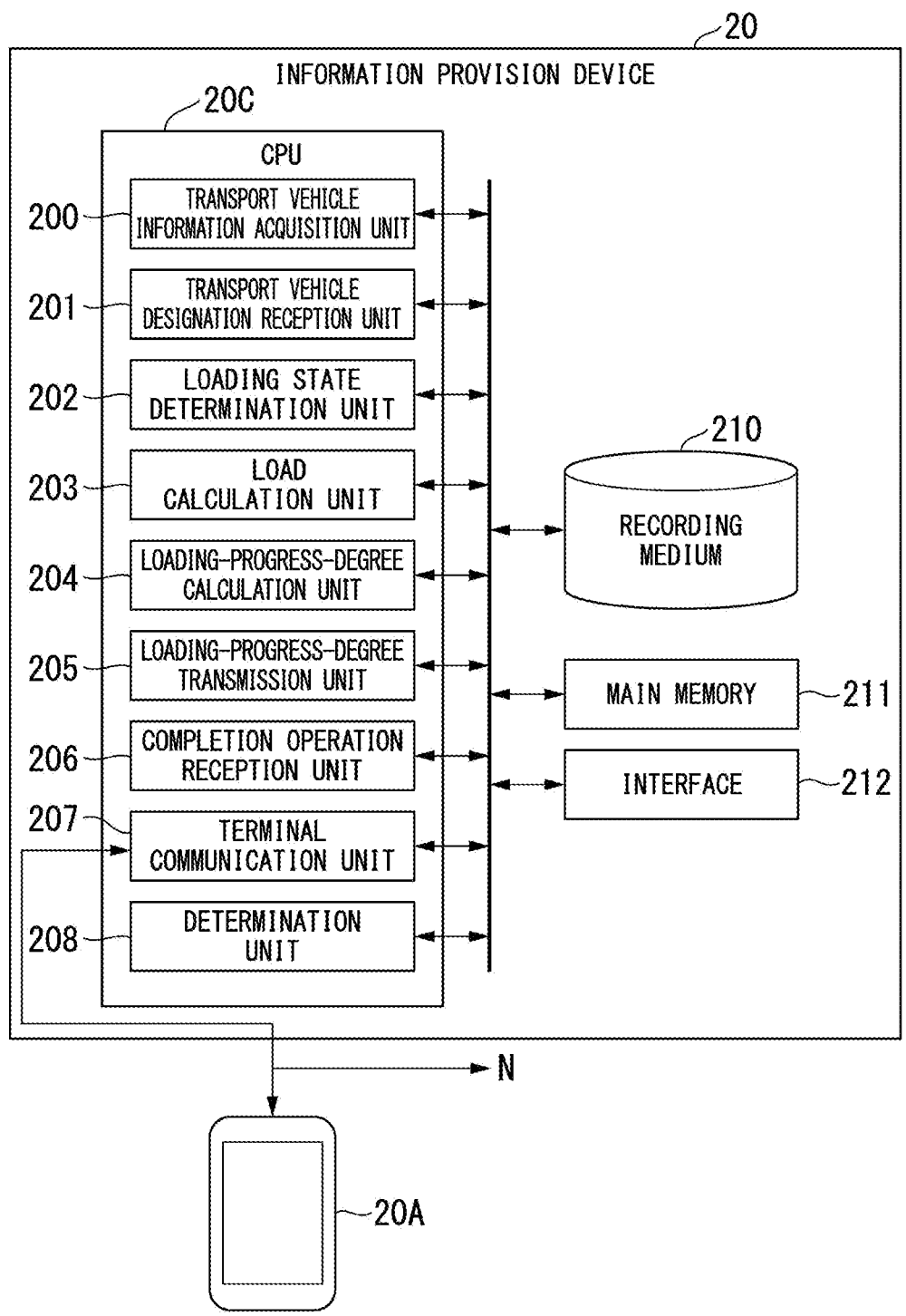
FIG. 3 is a diagram showing a functional configuration of an information provision device according to the first embodiment.

FIG. 3 is a diagram showing a functional configuration of the information provision device according to the first embodiment.

As shown in FIG. 3, the information provision device 20 includes a CPU 20C, a recording medium 210, a main memory 211, and an interface 212.

Here, the main memory 211 is a volatile memory (RAM) used as a work area of the CPU 20C. The interface 212 is a communication interface used to perform communication with the server device 10 or the like.

The recording medium 210 is a large capacity recording device built into the information provision device 20, and is, for example, a hard disk drive (HDD) or a nonvolatile memory.

The CPU 20C operates according to a program loaded into the main memory 211, and thus functions as a transport vehicle information acquisition unit 200, a transport vehicle designation reception unit 201, a loading state determination unit 202, a load calculation unit 203, a loading-progress-degree calculation unit 204, a loading-progress-degree transmission unit 205, a completion operation reception unit 206, a terminal communication unit 207, and a determination unit 208.

The transport vehicle information acquisition unit 200 transmits request information to the server device 10, and acquires transport vehicle information corresponding to the loading vehicle 2 from the server device 10. The transport vehicle information is an information table indicating the maximum load capacity and an original load amount of each of a plurality of transport vehicles 3 (FIG. 1) allocated to loading work in the construction site F1. A specific content of the transport vehicle information will be described later.

The transport vehicle designation reception unit 201 receives a predetermined transport vehicle designation operation of the operator via the terminal device 20A possessed by the operator of the loading vehicle 2, and specifies the transport vehicle 3 which is a target of loading work. The transport vehicle designation operation is an operation for which the operator of the loading vehicle 2 designates the new transport vehicle 3 which arrives at the construction site F1 and is a target of loading work.

The loading state determination unit 202 determines whether or not the loading vehicle 2 is in a loading state. Specifically, the loading state determination unit 202 determines that the loading vehicle 2 is in a loading state in a case where a height of the bucket of the loading vehicle 2 is equal to or more than a predetermined height determination threshold value. The loading state indicates a state in which the bucket of the loading vehicle 2 excavates a ground surface, and then holds an excavated object (transport object). Here, the loading state determination unit 202 detects drive states (cylinder strokes and the like) of various drive members provided in the work equipment, and thus calculates a pose angle of the work equipment. The loading state determination unit 202 determines whether or not a height of the bucket of the loading vehicle 2 is equal to or more than the predetermined height determination threshold value on the basis of a result of the calculation of the pose angle of the work equipment.

A specific process for determination whether or not the loading vehicle 2 is in a loading state will be described later.

The load calculation unit 203 calculates a load of a transport object loaded onto the transport vehicle 3 through one loading operation performed by the loading vehicle 2, that is, a load of the transport object held in the bucket of the loading vehicle 2 through loading work performed. The loading work is assumed to indicate a series of operations from an operation in which the operator of the loading vehicle 2 operates the bucket of the loading vehicle 2 to excavate a ground surface or the like to an operation in which the transport object held in the bucket is loaded onto a cargo bed of the transport vehicle 3. The load calculation unit 203 acquires sensor detection values for load calculation from pressure sensors provided respective locations of the work equipment. The load calculation unit 203 performs load calculation on the basis of the respective sensor detection values.

The loading-progress-degree calculation unit 204 calculates the degree of progress of loading work performed on the transport vehicle 3 specified as a loading target by the loading vehicle 2. Here, loading work on a single transport vehicle 3 is performed through one or a plurality of loading operations of the loading vehicle 2, and is completed at the time at which a transport object is loaded within the maximum load capacity of the transport vehicle 3.

The loading-progress-degree calculation unit 204 calculates the degree of progress of loading work on the basis of an accumulated value of a load of a transport object calculated every single loading operation and the maximum load capacity of the transport vehicle 3 which is a target of the loading work. In the present embodiment, the loading-progress-degree calculation unit 204 acquires the maximum load capacity of the transport vehicle 3 which is a loading work target by referring to transport vehicle information (described later) acquired by the transport vehicle information acquisition unit 200.

The loading-progress-degree transmission unit 205 transmits various pieces of information indicating the degree of progress of loading work to the server device 10 via the wide area network N. Particularly, in a case where the degree of progress of loading work on a single transport vehicle 3 is in an intermediate stage of the loading work of a predetermined degree-of-progress determination threshold value or more, the loading-progress-degree transmission unit 205 according to the present embodiment transmits loading intermediate information indicating that the loading work is in the intermediate stage, to the server device 10. Here, the degree-of-progress determination threshold value is a prescribed value corresponding to an intermediate stage of loading work in the degree of progress (0% to 100%) of the loading work on a single transport vehicle 3. The prescribed value is defined to be, for example, 70%. The degree-of-progress determination threshold value is prescribed to be any value which is more than 0% and less than 100%. The loading intermediate information is one of pieces of information indicating the degree of progress of loading work, and is information indicating that the loading work is in an intermediate stage corresponding to a state of reaching the degree of progress of 70%.

The loading-progress-degree transmission unit 205 further transmits loading start information and loading completion information to the server device 10 in addition to the loading intermediate information. The loading start information is one of pieces of information indicating the degree of progress of loading work, and is information indicating that the loading work is started. The loading completion information is one of pieces of information indicating the degree of progress of loading work, and is information indicating that the loading work is completed.

The completion operation reception unit 206 receives a predetermined completion operation from the operator of the loading vehicle 2 via the terminal device 20A. The completion operation is an operation which is input by the operator of the loading vehicle 2 in order to transmit loading completion information in a case where loading work on a single transport vehicle 3 is completed.

The terminal communication unit 207 performs communication with the terminal device 20A possessed by the operator of the loading vehicle 2 in a wired or wireless manner. In a case where the terminal device 20A is used as a stationary terminal, the terminal communication unit 207 may use an in-vehicle dedicated communication line such as a CAN.

The determination unit 208 determines whether or not the degree of progress of loading work on the transport vehicle 3 is equal to or more than a predetermined degree-of-progress determination threshold value corresponding to an intermediate stage of the loading work.

Various pieces of information related to processes of the various functional units are recorded on the recording medium 210. For example, the transport vehicle information acquired by the transport vehicle information acquisition unit 200, a dimension of the work equipment, and a capacity of the bucket are recorded on the recording medium 210.

(Process Flow During Acquisition of Transport Vehicle Information)

Figures 4, 5:
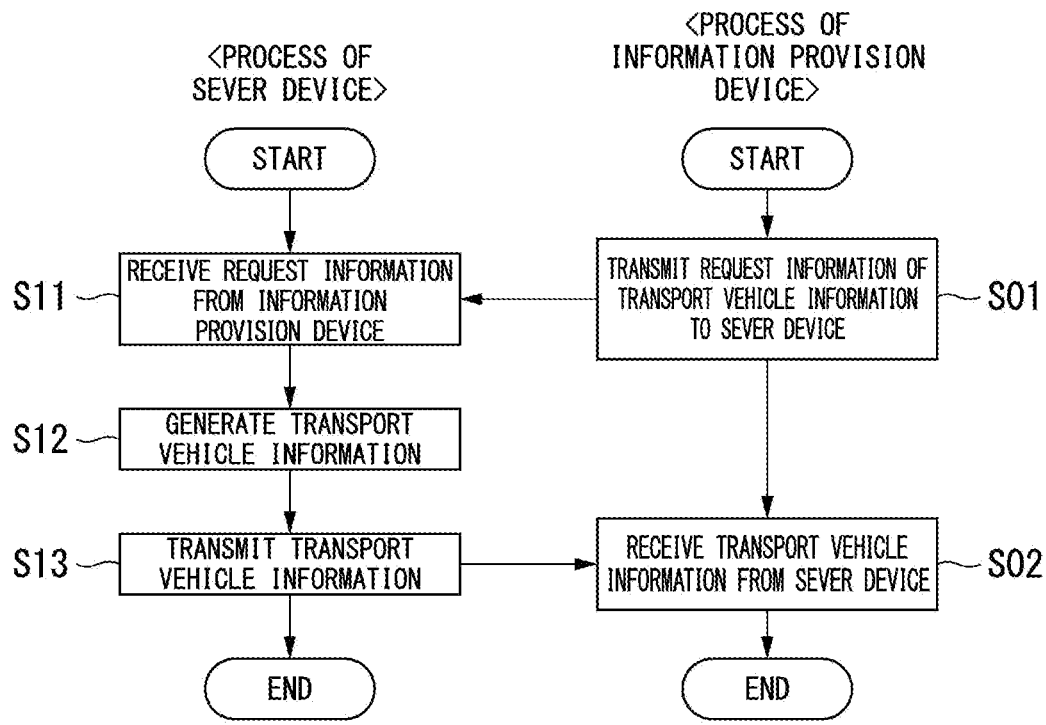
FIG. 4 is a flowchart showing a process flow when the information provision device and the server device according to the first embodiment acquire transport vehicle information.
FIG. 5 is a diagram showing a configuration example of the transport vehicle information according to the first embodiment.

FIG. 4 is a flowchart showing a process flow when the information provision device and the server device according to the first embodiment acquire transport vehicle information.

FIG. 5 is a diagram showing a configuration example of the transport vehicle information according to the first embodiment.

Hereinafter, with reference to FIGS. 4 and 5, a description will be made of a process flow in which the information provision device 20 acquires transport vehicle information.

The process flow shown in FIG. 4 is executed, for example, when an engine of the loading vehicle 2 is started, and power is supplied to the information provision device 20 (FIG. 1). There may be an aspect in which the process flow is periodically executed even after power is supplied to the information provision device 20.

The transport vehicle information acquisition unit 200 of the information provision device 20 transmits request information for acquiring transport vehicle information, to the server device 10 via the wide area network N (FIG. 1) (step S01). The request information includes information for uniquely identifying the loading vehicle 2. The information for uniquely identifying the loading vehicle 2 is information including, for example, a model, the type, or a machine number of the loading vehicle 2, and will be hereinafter referred to as a loading vehicle ID in some cases.

The loading vehicle communication unit 100 of the server device 10 receives the request information from the information provision device 20 (step S11).

In a case where the loading vehicle communication unit 100 receives the request information, the transport vehicle information generation unit 101 of the server device 10 generates transport vehicle information on the basis of the received request information (step S12).

Here, the process in step S12 performed by the transport vehicle information generation unit 101 will be described in detail.

First, the transport vehicle information generation unit 101 acquires the loading vehicle ID included in the request information received in step S11, and refers to a predetermined allocation information table. The allocation information table is an information table prepared in the recording medium 110 in advance, and is an information table in which the loading vehicle 2 and the transport vehicle 3 allocated to loading work in the identical construction site F1 are correlated with each other.

The transport vehicle information generation unit 101 refers to the allocation information table, and specifies a plurality of transport vehicle IDs corresponding to the loading vehicle ID included in the request information received in step S11. The transport vehicle information generation unit 101 generates transport vehicle information in which the specified transport vehicle IDs are correlated with the maximum load capacities prescribed for the respective transport vehicle IDs. The transport vehicle ID is information for uniquely identifying the transport vehicle 3, and is, for example, a vehicle registration number written on a number plate.

FIG. 5 illustrates a configuration example of the transport vehicle information generated by the transport vehicle information generation unit 101.

As shown in FIG. 5, the transport vehicle ID of each transport vehicle 3 allocated to loading work in the construction site F1, the maximum load capacity prescribed for each transport vehicle 3, and an original load amount of each transport vehicle 3 based on measurement of the vehicle weight meter 4 are recorded in the transport vehicle information in association with each other.

Typically, the transport vehicle 3 arrives at the construction site F1 in a state (original load amount=0 kg) in which nothing is loaded on the cargo bed thereof. However, it is supposed that a certain transport vehicle 3 arrives in a state in which some transport objects (earth and sand or the like) are attached to the cargo bed thereof. In this case, since the transport vehicle 3 is loaded with a transport object in a stage before loading work is performed, the operator of the loading vehicle 2 is required to perform the loading work by taking into consideration the transport object which is already loaded.

The loading vehicle communication unit 100 of the server device 10 transmits the transport vehicle information (FIG. 5) generated by the transport vehicle information generation unit 101 to the information provision device 20 in response to the request information received in step S11 (step S13).

The transport vehicle information acquisition unit 200 of the information provision device 20 receives and acquires the transport vehicle information from the server device 10 (step S02).

(Process Flow During Loading Work)

Figure 6:
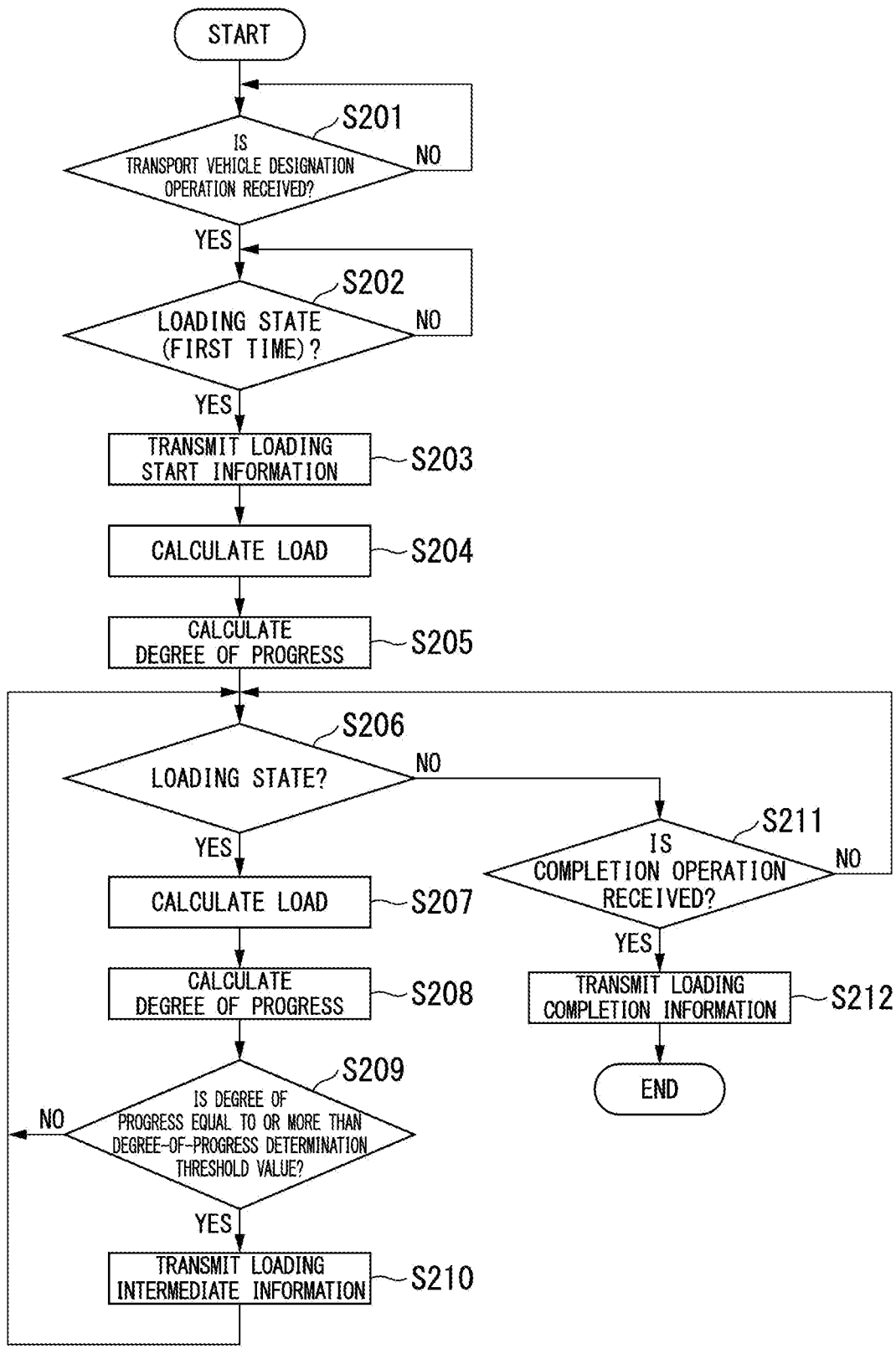
FIG. 6 is a flowchart showing a flow of a process during loading work, performed by the information provision device according to the first embodiment.

FIG. 6 is a flowchart showing a flow of a process during loading work, performed by the information provision device according to the first embodiment.

Figure 7:
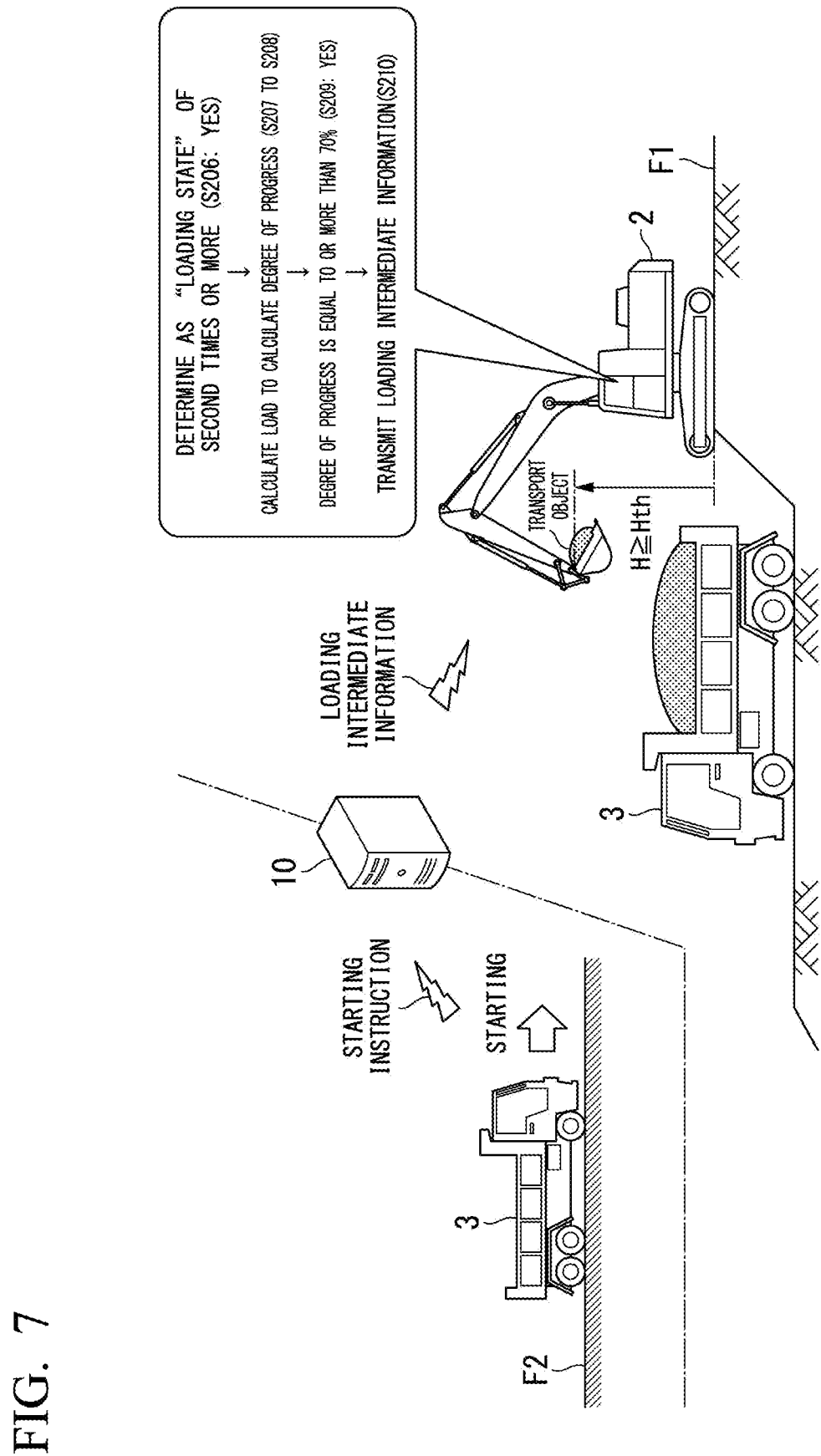
FIG. 7 is a diagram for describing in detail each process during loading work, performed by the information provision device according to the first embodiment.

FIG. 7 is a diagram for describing in detail each process during loading work, performed by the information provision device according to the first embodiment.

Hereinafter, with reference to FIGS. 6 and 7, a process performed by the information provision device 20 will be described in detail.

The process flow shown in FIG. 6 is started at the time at which, for example, the operator of the loading vehicle 2 operates the terminal device 20A to start a dedicated program (application).

First, the transport vehicle designation reception unit 201 of the information provision device 20 determines whether or not a transport vehicle designation operation has been received from the operator of the loading vehicle 2 via the terminal device 20A (step S201).

Here, the process in step S201 will be described in detail.

The transport vehicle designation reception unit 201 displays a transport vehicle selection screen on a display panel of the terminal device 20A. Transport vehicle IDs, and the maximum load capacities and original load capacities respectively associated with the transport vehicle IDs included in transport vehicle information (FIG. 5) received from the server device 10 in advance are listed up on the transport vehicle selection screen. The maximum load capacity of the transport vehicle 3 is, for example, 10 tons.

The operator of the loading vehicle 2 can visually recognize the transport vehicle 3 in a stage in which the new transport vehicle 3 comes close to the loading vehicle 2. At this time, the operator operates the terminal device 20A to open the transport vehicle selection screen, and performs an operation of designating the arriving transport vehicle 3 on the basis of a feature of the visually recognized transport vehicle 3, for example, a vehicle registration number written on a number plate thereof. Specifically, the operator performs a touch operation on a transport vehicle ID corresponding to the visually recognized transport vehicle 3 among the transport vehicle IDs listed up on the transport vehicle selection screen.

Referring to FIG. 6 again, in a case where the transport vehicle designation operation is not received from the operator of the loading vehicle 2 (step S201: NO), the transport vehicle designation reception unit 201 repeatedly performs the process in step S201, and waits for the transport vehicle designation operation.

On the other hand, in a case where the transport vehicle designation operation has been received from the operator of the loading vehicle 2 (step S201: YES), next, the loading state determination unit 202 of the information provision device 20 determines whether or not the loading vehicle 2 is in a first loading state, that is, a transport object is held in the bucket of the loading vehicle 2 (step S202).

Here, the operator of the loading vehicle 2 performs the transport vehicle designation operation (step S201: YES), and then operates the boom, the arm, and the bucket of the loading vehicle 2 so as to start actual loading work on the transport vehicle 3. In step S202, the loading state determination unit 202 performs a determination process regarding whether or not the loading vehicle 2 is in a loading state during a first loading operation.

In a case where the loading vehicle 2 is not in the first loading state (step S202: NO), the loading state determination unit 202 repeatedly performs the process in step S202, and waits for the first loading state.

In a case where the loading vehicle 2 is in the first loading state (step S202: YES), the loading-progress-degree transmission unit 205 of the information provision device 20 transmits loading start information to the server device 10 (step S203).

Here, each of the processes in step S202 and step S203 will be described in detail.

In the process in step S202 in FIG. 6, first, the loading state determination unit 202 determines whether or not a driving operation of raising the boom of the loading vehicle 2 is input by the operator.

In a case where the driving operation of raising the boom of the loading vehicle 2 is input, the loading state determination unit 202 further determines whether or not the bucket of the loading vehicle 2 is horizontal.

In a case where the bucket of the loading vehicle 2 is horizontal, the loading state determination unit 202 further determines whether or not a height of the bucket of the loading vehicle 2 is equal to or more than a predetermined height determination threshold value. Hereinafter, the height of the bucket of the loading vehicle 2 will be referred to as a bucket height in some cases.

In a case where the bucket height of the loading vehicle 2 is equal to or more than the height determination threshold value, the loading state determination unit 202 determines that the loading vehicle 2 is in a loading state.

On the other hand, in a case where the operation of raising the boom of the loading vehicle 2 is not input, the bucket of the loading vehicle 2 is not horizontal, or a bucket height of the loading vehicle 2 is not equal to or more than the height determination threshold value, the loading state determination unit 202 determines that the loading vehicle 2 is not in a loading state.

Referring to FIG. 6, the loading-progress-degree transmission unit 205 transmits the loading start information to the server device 10 (step S203), and then the load calculation unit 203 of the information provision device 20 calculates a load of a transport object held in the bucket of the loading vehicle 2 in the loading state (step S204).

Next, the loading-progress-degree calculation unit 204 of the information provision device 20 calculates the degree of progress of loading work performed on the arriving transport vehicle 3 (step S205). The loading-progress-degree calculation unit 204 calculates the degree of progress on the basis of the load of the transport object calculated in step S204 and the maximum load capacity of the transport vehicle 3 designated in step S201. Specifically, the loading-progress-degree calculation unit 204 calculates a ratio of the load of the transport object calculated in step S204 to the maximum load capacity of the transport vehicle 3, as the degree of progress [%] of the loading work on the transport vehicle 3.

Successively, the loading state determination unit 202 performs a determination process regarding whether or not the loading vehicle 2 is second and subsequent loading states (step S206).

Here, in a case where the loading vehicle 2 is in the first loading state (step S202: YES), and then the operator thereof loads a transport object held in the bucket onto the cargo bed of the transport vehicle 3, and completes the first loading operation. Successively, the operator further operates the loading vehicle 2 so as to start second and subsequent loading operations. In step S206, the loading state determination unit 202 performs a determination process regarding whether or not the loading vehicle 2 is in a loading state during each of the second and subsequent loading operations. The determination process performed in step S206 is the same as the determination process performed in step S202.

The processes from step S206 to step S210 (described later) are repeatedly performed in correspondence with each of the second and subsequent loading operations.

In a case where the loading vehicle 2 is in a loading state in the second and subsequent loading operations (step S206: YES), the load calculation unit 203 calculates a load of a transport object held in the bucket of the loading vehicle 2 in the loading state (step S207). The load calculation process in step S207 is the load calculation process performed in step S204.

Next, the loading-progress-degree calculation unit 204 calculates the degree of progress of loading work performed on the transport vehicle 3 (step S208). The loading-progress-degree calculation unit 204 adds the load calculated in step S207 through the present loading operation to an accumulated value of loads of the transport object calculated for the respective loading operations performed up to the previous time, so as to calculate an accumulated value of the loads. The accumulated value of the loads will be referred to as a load accumulated value in some cases.

For example, during the second loading operation, the loading-progress-degree calculation unit 204 adds the load calculated in step S204 during the first loading operation to the load calculated in step S207 executed for the first time during the second loading operation, so as to calculate a load accumulated value.

During the third loading operation, the load accumulated value calculated during the second loading operation is added to a load calculated in step S207 executed for the second time during the third loading operation, and thus a load accumulated value is calculated.

The loading-progress-degree calculation unit 204 calculates a ratio of the load accumulated value to the maximum load capacity of the transport vehicle 3 as the degree of progress [%] of the loading work on the transport vehicle 3.

As mentioned above, in each loading operation, the information provision device 20 calculates a load of a transport object held in the bucket (step S207), and also calculates and updates the degree of progress [%] of loading work (step S208), at a timing at which the loading vehicle 2 is in a loading state (step S206: YES).

Next, the determination unit 208 of the information provision device 20 determines whether or not the degree of progress calculated through the process in step S208 is equal to or more than a predetermined degree-of-progress determination threshold value (for example, 70%) corresponding to an intermediate stage of the loading work (step S209).

In a case where the degree of progress is equal to or more than the degree-of-progress determination threshold value (step S209: YES), the determination unit 208 determines that the loading work is in an intermediate stage. The loading-progress-degree transmission unit 205 transmits loading intermediate information indicating that the loading work is in an intermediate stage to the server device 10, on the basis of the determination of the determination unit 208 that the loading work is in an intermediate stage (step S210). In a case where the loading intermediate information is received from the loading-progress-degree transmission unit 205 of the information provision device 20, the transport vehicle starting instruction unit 102 of the server device 10 gives an instruction for starting toward the construction site F1 to the transport vehicle 3 standing by in the standby place F2.

On the other hand, in a case where the degree of progress is less than the degree-of-progress determination threshold value (step S209: NO), the determination unit 208 determines that the loading work is not in an intermediate stage. The loading-progress-degree transmission unit 205 returns to S206 without transmitting loading intermediate information on the basis of the determination of the determination unit 208 that the loading work is not in an intermediate stage.

Here, each of the processes from step S206 to step S210 will be described in detail with reference to FIG. 7.

FIG. 7 schematically illustrates situations of the construction site F1 and the standby place F2 when the processes from step S206 to step S210 are performed.

As shown in FIG. 7, the information provision device 20 performs load calculation (step S207) and degree-of-progress calculation (step S208) in a stage in which a bucket height H of the loading vehicle 2 is equal to or more than a height determination threshold value Hth and thus a loading state occurs (step S206: YES). In a case where the calculated degree of progress is equal to or more than the degree-of-progress determination threshold value (step S209: YES), the loading-progress-degree transmission unit 205 of the information provision device 20 transmits loading intermediate information to the server device 10 (step S210), and returns to S206.

In a case where the loading intermediate information is received, the transport vehicle starting instruction unit 102 (FIG. 2) of the server device 10 gives an instruction for starting toward the construction site F1 to the transport vehicle 3 which stands by in the standby place F2 and on which the next load is to be performed. The instruction for starting toward the construction site F1 will be hereinafter referred to as a starting instruction. Specifically, the transport vehicle starting instruction unit 102 transmits a starting instruction to the terminal device 30 possessed by a driver of the transport vehicle 3 on which the next load is to be performed. The driving having received the starting instruction starts the transport vehicle 3 toward the construction site F1.

In a case where there are a plurality of transport vehicles 3 standing by in the standby place F2, the server device 10 may select a single transport vehicle 3 to start toward the construction site F1, and may transmit a starting instruction to the selected single transport vehicle 3. In this case, for example, the server device 10 may acquire position information of each transport vehicle 3, and may select the transport vehicle 3 closest to the construction site F1 or the loading vehicle 2 on the basis of the position information.

Referring to FIG. 6 again, in a case where the loading vehicle 2 is not in a loading state in the second and subsequent loading operations (step S206: NO), the completion operation reception unit 206 of the information provision device 20 determines whether or not a completion operation has been received from the operator of the loading vehicle 2 via the terminal device 20A (step S211).

In a case where the completion operation is not received from the operator of the loading vehicle 2 (step S211: NO), the information provision device 20 repeatedly performs the processes in step S206 and step S211, and waits for transition to a loading state or for input of the operator's completion operation.

In a case where the completion operation has been received from the operator of the loading vehicle 2 (step S211: YES), the loading-progress-degree transmission unit 205 loading completion information to the server device 10 (step S212) and finishes the flow.

(Example of Process Performed by Loading Work Assistance System)

Figure 8:
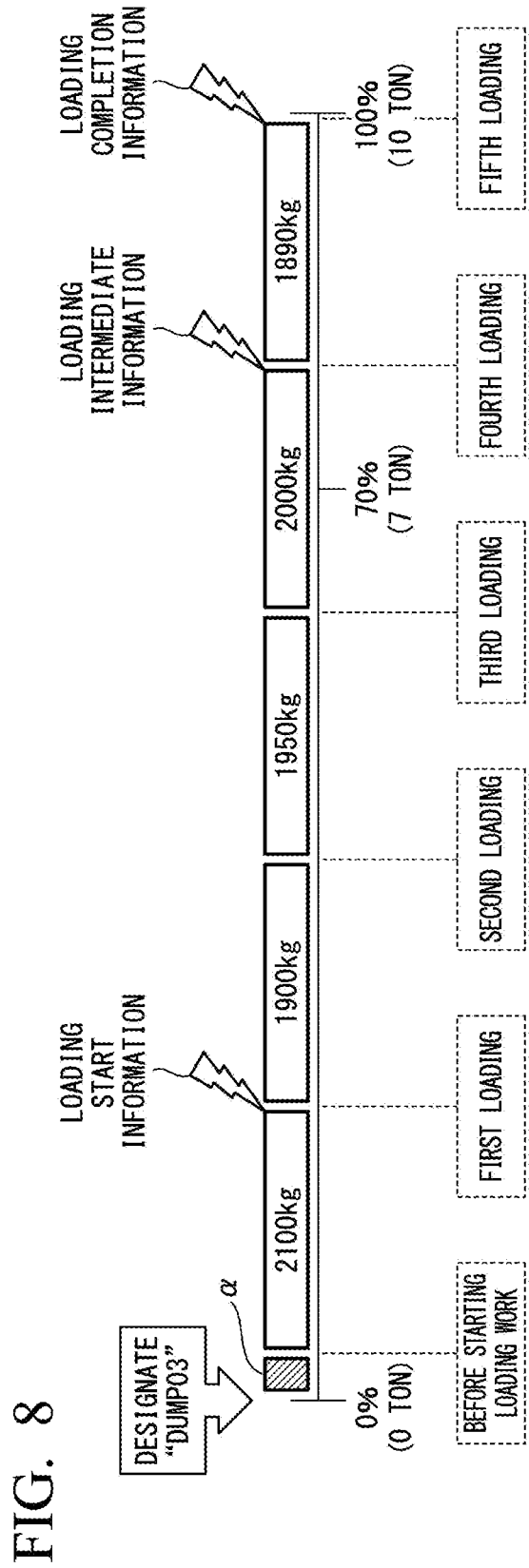
FIG. 8 is a diagram showing an example of a process performed by the loading work assistance system according to the first embodiment.

FIG. 8 is a diagram showing an example of a process performed by the loading work assistance system according to the first embodiment.

FIG. 8 illustrates an example of a flow of various processes in a case where five loading operations are performed on the transport vehicle 3 of which the maximum load capacity is 10 tons.

The operator of the loading vehicle 2 performs a process of designating the transport vehicle 3 (transport vehicle ID="DUMP03") of which the maximum load capacity is 10 tons (10000 kg), and then performs a first loading operation. In the example shown in FIG. 5, an original load amount of the transport vehicle 3 of which the transport vehicle ID is "DUMP03" is 100 kg. In this case, the loading-progress-degree calculation unit 204 calculates the degree of progress (the defrost operation a shown in FIG. 8) corresponding to a weight (100 kg) of a transport object loaded already at the time before loading work is started. The loading-progress-degree transmission unit 205 transmits loading start information to the server device 10 at the time at which a loading state occurs in the first loading operation. At this time, the load calculation unit 203 calculates a load accumulated value (100 kg+2100 kg=2200 kg) by adding a load of a transport object held in the bucket to the weight of the transport object loaded already at the time before the loading work is started. The loading-progress-degree calculation unit 204 calculates the defrost operation (2200 kg/10000 kg=22%) on the basis of the accumulated result.

Successively, the operator of the loading vehicle 2 performs second and third loading operations. The load calculation unit 203 calculates loads (1900 kg and 1950 kg) of transport objects held in the bucket at the time at which a loading state occurs in the second and third loading operations. The loading-progress-degree calculation unit 204 integrates loads calculated in the respective loading operations so as to calculate a load accumulated value. For example, a load accumulated value calculated during the third loading operation is 100 kg+2100 kg+1900 kg+1950 kg=6050 kg. The degree of progress is calculated to be 6050 kg/10000 kg=60.5%.

The operator of the loading vehicle 2 performs a fourth loading operation. The load calculation unit 203 calculates a load (2000 kg) of a transport object held in the bucket at the time at which a loading state occurs in the fourth loading operation. A load accumulated value calculated during the fourth loading operation is 100 kg+2100 kg+1900 kg+1950 kg+2000 kg=8050 kg. In this case, the degree of progress [%] calculated to be a ratio of the load accumulated value (8050 kg) to the maximum load capacity (10 tons) of the transport vehicle 3 is 80.5%, and is thus equal to or more than the degree-of-progress determination threshold value (70%). Therefore, the loading-progress-degree transmission unit 205 transmits loading intermediate information to the server device 10 at the time at which a loading state occurs during the fourth loading operation.

The operator of the loading vehicle 2 performs a fifth loading operation. The load calculation unit 203 calculates a load (1890 kg) of a transport object held in the bucket at the time at which a loading state occurs in the fifth loading operation. A load accumulated value calculated during the fifth loading operation is 100 kg+2100 kg+1900 kg+1950 kg+2000 kg+1890 kg=9940 kg. Here, the operator determines that the loading work on the transport vehicle 3 is completed when the transport object is loaded close to the maximum load capacity (10 tons) of the transport vehicle 3. In this case, the operator inputs a completion operation to the terminal device 20A. The loading-progress-degree transmission unit 205 transmits loading completion information to the server device 10 at the time at which the completion operation is received from the operator.

(Configuration Examples of Loading Start Information, Loading Intermediate Information, and Loading Completion Information)

FIG. 9 is a diagram showing configuration examples of loading start information, loading intermediate information, and loading completion information according to the first embodiment.

As shown in FIG. 9, each of loading start information, loading intermediate information, and loading completion information includes a loading vehicle ID of the loading vehicle 2 and a transport vehicle TD of the transport vehicle 3 related to loading work. The loading start information, the loading intermediate information, and the loading completion information respectively include pieces of information ("start", "intermediate", and "completion") indicating an attribute of the progress of loading work. Each of the loading start information, the loading intermediate information, and the loading completion information includes a load accumulated value at the time at which the information is transmitted, and information indicating the date and time.

Example of Screen Displayed on Terminal Device

Figure 10:
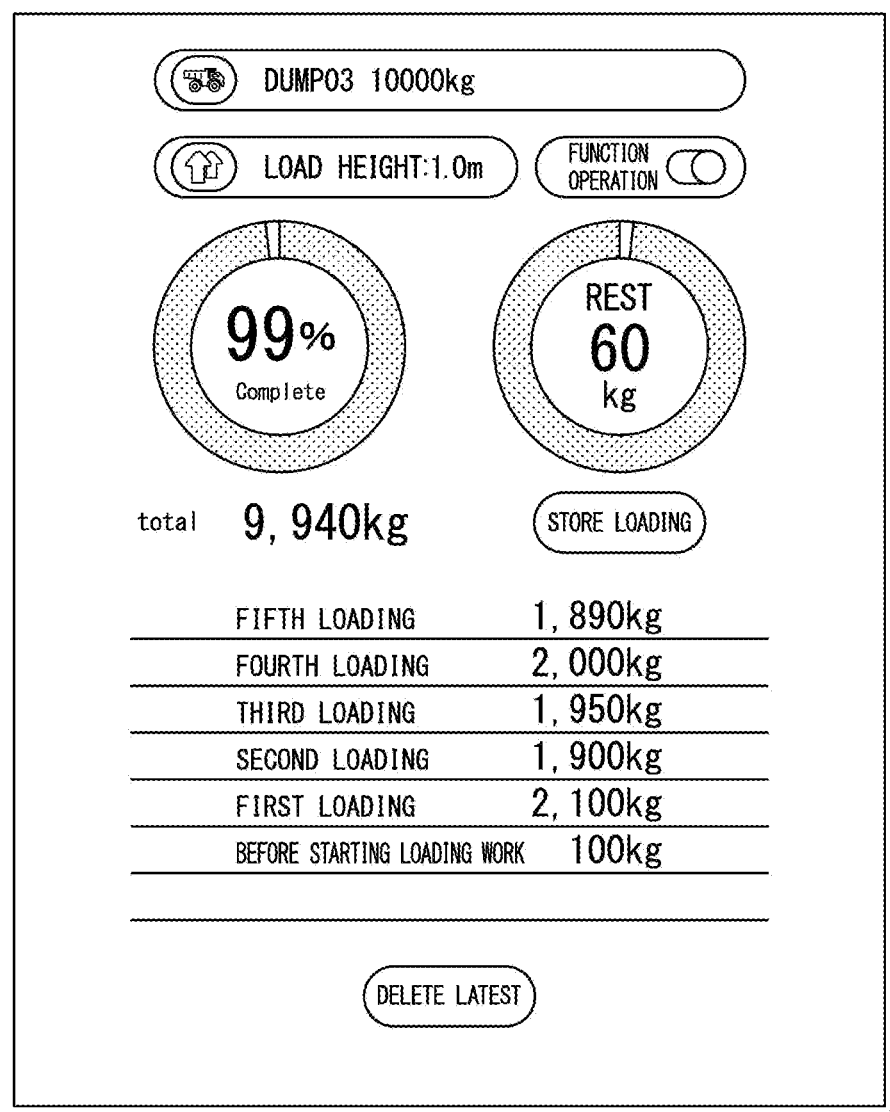
FIG. 10 is a diagram showing an example of a screen displayed on a terminal device according to the first embodiment.

FIG. 10 is a diagram showing an example of a screen displayed on the terminal device according to the first embodiment.

FIG. 10 illustrates an example of a display screen of the terminal device 20A possessed by the operator of the loading vehicle 2 during loading work.

As shown in FIG. 10, information (a vehicle identification ID and the maximum load capacity) regarding the transport vehicle 3 which is a loading work target, a load accumulated value (total), the degree of progress of the loading work, the history of a load of a transport object calculated every loading operation, and the like are displayed on a loading work screen D2.

The operator of the loading vehicle 2 visually recognizes the loading work screen D2 displayed on the terminal device 20A and can thus understand the degree of progress and the like while performing loading work.

A button of "store loading" displayed on the loading work screen D2 is a button for receiving the completion operation from the operator. In other words, the completion operation reception unit 206 receives a touch operation on the button of "store loading" from the operator, as a predetermined completion operation.

A button of a "function operation" displayed on the loading work screen D2 is a button for receiving temporary stoppage of loading work.

A button of "delete latest" displayed on the loading work screen D2 is a button for deleting the latest loading information among pieces of loading information displayed on a lower part.

In a case where a load accumulated value exceeds the maximum load capacity, the terminal device 20A may prompt a warning by changing color display of the loading work screen D2.

Advantageous Effects

As mentioned above, the information provision device 20 according to the first embodiment includes the loading-progress-degree calculation unit 204 which calculates the degree of progress of loading work performed on a single transport vehicle 3 by the loading vehicle 2, and the loading-progress-degree transmission unit 205 which transmits loading intermediate information indicating that the loading work is in an intermediate stage to the server device 10 in a case where the degree of progress is equal to or more than a degree-of-progress determination threshold value (for example, 70%) corresponding to the intermediate stage of the loading work.

In the above-described way, a driver of the transport vehicle 3 standing by in the standby place F2 can recognize to what intermediate stage (70%) the loading work performed in the construction site F1 progresses. Therefore, the driver of the transport vehicle 3 can leave the standby place F2 and go forward the construction site F1 in a situation in which the loading work performed in the construction site F1 is in an intermediate stage (refer to FIG. 7).

Consequently, the loading work performed in the construction site F1 is accurately completed in a period of time in which the transport vehicle 3 leaving the standby place F2 reaches the construction site F1. Therefore, the new transport vehicle 3 arrives at the construction site F1 immediately after the transport vehicle 3 on which loading work is completed leaves the construction site F1. Thus, it is possible to reduce a standby time of the loading vehicle 2 occurring when the transport vehicles 3 are replaced with each other.

From the above description, it is possible to improve operation efficiency of a loading vehicle and a transport vehicle related to loading work.

The information provision device 20 according to the first embodiment further includes the transport vehicle information acquisition unit 200 which acquires the maximum load capacity of the transport vehicle 3. The loading-progress-degree calculation unit 204 calculates the degree of progress of loading work on the basis of the maximum load capacity.

In the above-described way, even in a case where the maximum load capacities of a plurality of transport vehicles 3 allocated to loading work in the construction site F1 are different from each other, the degree of progress of the loading work corresponding to the maximum load capacities of the transport vehicles 3 can be understood.

The information provision device 20 according to the first embodiment further includes the load calculation unit 203 which calculates a load of a transport object loaded onto the transport vehicle 3 through one loading operation. The loading-progress-degree calculation unit 204 calculates the degree of progress of loading work on the basis of an accumulated value of a load (load accumulated value) calculated every loading operation.

In the above-described way, the degree of progress of loading work can be calculated to be a ratio of a load accumulated value to the maximum load capacity of the transport vehicle 3. Consequently, methods of calculating the degree of progress may not be differentiated from each other for respective types of transport objects (for example, mud, earth and sand, and gravel) of which loads (densities) per unit volume are different from each other.

The information provision device 20 according to the first embodiment further includes the loading state determination unit 202 which determines that the loading vehicle 2 is in a loading state in a case where a height of the bucket of the loading vehicle 2 is equal to or more than the predetermined height determination threshold value Hth. The loading-progress-degree transmission unit 205 updates the degree of progress of loading work at a timing at which the loading vehicle 2 is brought into a loading state.

In the above-described way, an operator of the loading vehicle 2 can understand a load accumulated value including a load of a transport object held in the bucket and the degree of progress of work in a stage in which the transport object is held in the bucket of the loading vehicle 2. Consequently, the operator can understand whether or not the maximum load capacity is exceeded before a transport object held in the bucket of the loading vehicle 2 is actually loaded onto the transport vehicle 3, and thus it becomes easier to adjust a load capacity for the transport vehicle 3.

According to the information provision device 20 of the first embodiment, the loading-progress-degree transmission unit 205 transmits the loading start information indicating that loading work is started and the loading completion information indicating that the loading work is completed, to the server device 10 in addition to the loading intermediate information.

In the above-described way, a driver of the transport vehicle 3 or a manager managing work performed in the construction site F1 can understand the progress of loading work in more detail. A cycle time of loading work can be understood by computing a period of time from a time point at which the loading start information is transmitted to a time point at which the loading completion information is transmitted. Consequently, for example, data for improving work of an operator of the loading vehicle 2 can be collected.

The server device 10 according to the first embodiment includes the transport vehicle starting instruction unit 102 which gives an instruction for starting toward the construction site F1 (loading vehicle 2) to the transport vehicle 3 standing by in the standby place F2 in a case where the loading intermediate information is received from the information provision device 20.

In the above-described way, a driver of the transport vehicle 3 can understand a favorable timing of starting toward the construction site F1 in order to improve operation efficiency.

According to the information provision device 20 of the first embodiment, the transport vehicle information acquisition unit 200 further acquires an original load amount in addition to the maximum load capacity of the transport vehicle 3. The loading-progress-degree calculation unit 204 calculates the degree of progress on the basis of the acquired maximum load capacity and original load amount.

In the above-described way, it is possible to perform loading work such that the maximum load capacity is not exceeded while taking into consideration a weight of a transport object (earth and sand or the like attached to the cargo bed) loaded already at the time at which the transport vehicle 3 arrives at the construction site F1.

Modification Examples

As mentioned above, the loading work assistance system 1 (the server device 10 and the information provision device 20) according to the first embodiment has been described in detail, but specific aspects of the loading work assistance system 1 are not limited to the above description, and various design changes and the like may occur within the scope without departing from the spirit.

In the loading work assistance system 1 according to the first embodiment, the degree-of-progress determination threshold value has been described to be fixed (for example, fixed to 70%); however, other embodiments are not limited to this aspect.

In the loading work assistance system 1 according to other embodiments, there may be an aspect in which the degree-of-progress determination threshold value is changed to a desired value in a range between 0% and 100%.

In the above-described way, in a case where a positional relationship or the like between the construction site F1 and the standby place F2 is changed, the degree-of-progress determination threshold value may be changed to an appropriate value corresponding to the change.

In the loading work assistance system 1 according to the first embodiment, the defined degree-of-progress determination threshold value has been described to be one kind of value (for example, 70%), but is not limited to this aspect in other embodiments. In the loading work assistance system 1 according to other embodiments, there may be an aspect in which a plurality of kinds of degree-of-progress determination threshold values (for example, 30%, 50%, and 70%) may be prescribed. In this case, the loading-progress-degree transmission unit 205 of the information provision device 20 transmits the loading intermediate information a plurality of times at the time at which the degree of progress is equal to or more than each degree-of-progress determination threshold value.

In the above-described way, a driver of the transport vehicle 3 or a manager of the construction site F1 can understand the progress of loading work in more detail.

The loading-progress-degree calculation unit 204 of the information provision device 20 according to the first embodiment has been described to calculate the degree of progress on the basis of an accumulated value of a load calculated every loading operation, but is not limited to this aspect in other embodiments.

For example, the loading-progress-degree calculation unit 204 according to other embodiments may calculate the degree of progress on the basis of a prescribed maximum number of times of loading and the number of loading operations (number of times of loading) actually performed on a single transport vehicle 3. For example, in a case where the maximum number of times of loading for a certain transport vehicle 3 is prescribed to be "ten", the loading-progress-degree calculation unit 204 calculates the degree of progress at the time (the time at which the number of times of loading is "three") at which a loading state occurs during a third loading operation, to be "30%".

The transport vehicle information acquisition unit 200 of the information provision device 20 according to the first embodiment has been described to acquire the maximum load capacity (the maximum load capacity indicated by transport vehicle information) prescribed for each transport vehicle 3 from the server device 10 (refer to FIGS. 4 and 5), but is not limited to this aspect in other embodiments.

For example, the transport vehicle information acquisition unit 200 according to other embodiments may have a function of specifying the maximum load capacity of arriving transport vehicle 3 on the basis of image data acquired from a camera mounted on the loading vehicle 2 (or a camera mounted on the terminal device 20A). In this case, the information provision device 20 may specify the maximum load capacity of the transport vehicle 3 according to, for example, the following procedures. First, the information provision device 20 images the transport vehicle 3 arriving at the construction site F1 with the camera. Next, the information provision device 20 performs an image analysis process on the image data in which the transport vehicle 3 is imaged, and thus specifies a model, the type, or the like of the imaged transport vehicle 3. The information provision device 20 specifies the maximum load capacity on the basis of the specified model, type, or the like.

The transport vehicle designation reception unit 201 of the information provision device 20 according to the first embodiment has been described to receive an operation (transport vehicle designation operation) of designating the arriving transport vehicle 3 from an operator of the loading vehicle 2 at the time at which the transport vehicle 3 arrives at the construction site F1, but is not limited to this aspect in other embodiments.

The information provision device 20 according to other embodiments may have a function of automatically starting wireless communication (wireless communication using, for example, Radio Frequency Identifier (RFID), Dedicated Short Range Communications (DSRC), and Bluetooth (registered trademark)) with the transport vehicle 3 and of acquiring a transport vehicle ID and the maximum load capacity, in a case where the new transport vehicle 3 arrives at the construction site F1, and a distance to the loading vehicle 2 is within a predetermined distance.

In the above-described way, it is possible to save time and effort for an operator of the loading vehicle 2 to manually designate the arriving transport vehicle 3.

The transport vehicle designation reception unit 201 of the information provision device 20 according to the first embodiment has been described to list up all of transport vehicle IDs (and the maximum load capacities) of the transport vehicles 3 allocated to loading work in the construction site F1 when a transport vehicle designation operation is received. However, other embodiments are not limited to this aspect.

For example, the transport vehicle information acquisition unit 200 according to other embodiments further acquires the current position information (latitude and longitude information) of each of the transport vehicle 3, specified on the basis of a global navigation satellite system (GNSS) in addition to the transport vehicle IDs, the maximum capacities, and the like. The transport vehicle designation reception unit 201 according to other embodiments refers to the current position information of each transport vehicle 3, and lists up only the transport vehicle 3 located near the construction site F1 (loading vehicle 2) on a transport vehicle selection screen D1.

In the above-described way, an operator of the loading vehicle 2 can select a transport vehicle from among more narrowed candidates when the arriving transport vehicle 3 is designated, and thus it is possible to reduce a burden on the operator related to a transport vehicle designation operation.

The transport vehicle starting instruction unit 102 of the server device 10 according to the first embodiment has been described to transmit a starting instruction to the terminal device 30 possessed by a driver of the transport vehicle 3 during standby in a case where the loading intermediate information is received from the information provision device 20, but is not limited to this aspect.

For example, the transport vehicle starting instruction unit 102 according to other embodiments may transmit a starting instruction to a semaphore (provided with a starting instruction lamp (blue lamp)) provided at an entrance of the standby place F2. In this case, the semaphore lights the starting instruction lamp in a case where a starting instruction is received from the server device 10. A driver of the transport vehicle 3 standing by in the standby place F2 starts the transport vehicle 3 toward the construction site F1 (loading vehicle 2) when lighting of the starting instruction lamp is visually recognized.

The transport vehicle starting instruction unit 102 according to other embodiments may transmit a starting instruction to a terminal device of a starting instruction person around the entrance of the standby place F2. Here, the starting instruction person is a person giving an instruction for starting or standby with utterance or a gesture to a driver of the transport vehicle 3 standing by in the standby place F2. In this case, the starting instruction person gives an instruction for starting toward the construction site F1 (loading vehicle 2) to the driver of the transport vehicle 3 standing by in the standby place F2 in a case where a starting instruction is received from the server device 10 to the terminal device possessed thereby.

There may be an aspect in which the loading vehicle 2 is provided with a signal lamp (for example, Patlite®), and lights the signal lamp in response to reception of the loading intermediate information. In this case, the driver of the transport vehicle 3 standing by in the standby place F2 starts toward the construction site F1 from the standby position when visually recognizing lighting of the signal lamp of the loading vehicle 2 located in the construction site F1. This aspect is also assumed to include "transmission of a starting instruction".

A description has been made of a case where the loading work assistance system 1 according to the first embodiment transmits the loading intermediate information to the server device 10 of the information provision device 20, and the server device 10 having received the loading intermediate information transmits a starting instruction to the transport vehicle 3 (terminal device 30). However, other embodiments are not limited to this aspect.

For example, in the loading work assistance system 1 according to other embodiments, the information provision device 20 may directly transmit the loading intermediate information to the terminal device 30 possessed by a driver of the transport vehicle 3. In this case, the terminal device 30 corresponds to an external device. In this case, the terminal device 30 notifies the driver of reception of the loading intermediate information. The driver of the transport vehicle 3 starts the transport vehicle 3 toward the construction site F1 (loading vehicle 2) when the notification is received.

The loading-progress-degree calculation unit 204 of the information provision device 20 according to the first embodiment has been described to calculate and update the degree of progress in a case where the bucket of the loading vehicle 2 is equal to or more than a predetermined height determination threshold value, but is not limited to this aspect in other embodiments.

The loading-progress-degree calculation unit 204 according to other embodiments may calculate and update the degree of progress when a drive state of the boom, the arm, the bucket, or the like of the loading vehicle 2 during a loading operation satisfies a predetermined condition which is different from that in the first embodiment.

The information provision device 20 according to other embodiments may have a function of change the height determination threshold value to a desired value. The height determination threshold value may be changed according to, for example, the following procedures. Specifically, in a case where the height determination threshold value is changed, first, an operator of the loading vehicle 2 operates the bucket of the loading vehicle 2 to a desired height. Next, the operator touches a predetermined button (height setting button) displayed on the terminal device 20A when a bucket height of the loading vehicle 2 becomes the desired height. The information provision device 20 sets the bucket height at the time of receiving the touch as a new height determination threshold value.

In the above-described way, it is possible to appropriately adjust a timing of updating the degree of progress in accordance with a landform of the construction site F1 or a cargo bed height of the transport vehicle 3.

The information provision device 20 according to the first embodiment has been described to be in an aspect of being mounted on the loading vehicle 2, but is not limited to this aspect in other embodiments.

In other words, the information provision device 20 according to other embodiments may be in an aspect of being provided in locations other than the loading vehicle 2, such as a site office of the construction site F1.

In other embodiments, the information provision device 20 may be included in the server device 10. In other words, the information provision device 20 and the server device 10 described in the first embodiment may be implemented by a single computer having all of the functions thereof. Even in this aspect, the server device 10 is assumed to correspond to an external device of the information provision device 20. In this case, the terminal device 30 possessed by a driver of the transport vehicle 3 may correspond to an external device.

An operator of the loading vehicle 2 according to the first embodiment has been described to perform a touch operation on the terminal device 20A possessed thereby in a state of riding the loading vehicle 2, but is not limited to this aspect in other embodiments.

For example, the operator of the loading vehicle 2 according to other embodiments may be in an aspect of remotely controlling the loading vehicle 2 from a location far from the loading vehicle 2 by using an operation console (remote controller) for remote control. In this case, the operator of the loading vehicle 2 may perform a touch operation or the like on the terminal device 20A possessed thereby at a position far from the loading vehicle 2.

In the first embodiment, a description will be made of a case where loading work is performed on the transport vehicle 3 one by one, and the information provision device 20 calculates the degree of progress of the loading work on the single transport vehicle 3, but other embodiments are not limited to this aspect.

In other embodiments, loading work may be performed on a plurality of (for example, two) transport vehicles 3 which arrive simultaneously. In this case, first, the operator of the loading vehicle 2 performs a transport vehicle designation operation on each of the plurality of transport vehicles 3 arriving simultaneously. The information provision device 20 calculates the degree of progress of loading work performed on the plurality of transport vehicles 3 designated through the transport vehicle designation operation. For example, in a case where the loading vehicle 2 performs loading work on two transport vehicles 3, the information provision device 20 may calculate the degree of progress of the loading work to be a ratio of a load accumulated value to a sum of two maximum load capacities (for example, 10 tons+10 tons=20 tons).

The information provision device 20 according to the first embodiment has been described to be in an aspect of being implemented by a single device provided in a single casing, but is not limited to this aspect.

For example, in the information provision device 20 according to other embodiments, the various functional units shown in FIG. 3 may be in an aspect of being provided to be distributed to two or more devices connected to each other via a predetermined communication network (for example, a CAN network).

The loading work assistance system 1 according to the first embodiment has been described to include the vehicle weight meter 4 and acquire an original load amount of the transport vehicle 3, but is not limited to this aspect in other embodiments. In other words, the loading work assistance system 1 according to other embodiments may be in an aspect of not including the vehicle weight meter 4 and not acquiring an original load amount of a transport vehicle. In this case, there may be an aspect in which the information provision device 20 calculates the degree of progress of loading work, for example, assuming that the transport vehicle 3 arriving at the construction site F1 is in a state of not being loaded with a loaded object or a heavy object.

The loading work assistance system 1 according to the first embodiment includes the server device 10 and acquires the loading intermediate information, but is not limited to this aspect in other embodiments. The loading work assistance system 1 according to other embodiments may be in an aspect of not including the server device 10. In this case, the transport vehicle starting instruction unit 102 may be in an aspect of being provided in the information provision device 20. There may be an aspect in which a starting instruction is transmitted to the terminal device 30 of the transport vehicle 3 or a terminal device of a starting instruction person. There may be an aspect in which an external device is, for example, the terminal device 30.

A description has been made of a case where the server device 10 according to the first embodiment generates transport vehicle information and transmits the transport vehicle information to the information provision device 20 in a case where request information transmitted from the information provision device 20 is received. However, other embodiments are not limited to this aspect. For example, there may be an aspect in which the server device 10 according to other embodiments periodically transmits transport vehicle information to the information provision device 20 even though request information from the information provision device 20 is not received.

The information provision device 20 according to the first embodiment has been described to be implemented by a single computer having all of the functions of the transport vehicle information acquisition unit 200, the transport vehicle designation reception unit 201, the loading state determination unit 202, the load calculation unit 203, the loading-progress-degree calculation unit 204, the loading-progress-degree transmission unit 205, the completion operation reception unit 206, the terminal communication unit 207, and the determination unit 208, but is not limited to this aspect in other embodiments.

There may be an aspect in which the information provision device 20 according to other embodiments is implemented by a plurality of computers which are communicably connected to each other via a network. In this case, each of the plurality of computers is assumed to have some of the functions of the transport vehicle information acquisition unit 200, the transport vehicle designation reception unit 201, the loading state determination unit 202, the load calculation unit 203, the loading-progress-degree calculation unit 204, the loading-progress-degree transmission unit 205, the completion operation reception unit 206, the terminal communication unit 207, and the determination unit 208. Some of the functions of the information provision device 20 may be installed outside the loading vehicle 2.

As mentioned above, several embodiments of the present invention have been described, but the embodiments are presented as only examples, and thus are not intended to limit the scope of the invention. The embodiments may be implemented in other various forms, and various omissions, alterations, and changes may occur within the scope without departing from the spirit of the invention. The embodiments or modifications thereof are included in the inventions disclosed in the claims and equivalents thereof as included in the scope and the spirit of the invention.

INDUSTRIAL APPLICABILITY

According to the aspects, it is possible to improve operation efficiency of a loading vehicle and a transport vehicle related to loading work.

REFERENCE SIGNS LIST

1: LOADING WORK ASSISTANCE SYSTEM
10: SERVER DEVICE
100: LOADING VEHICLE COMMUNICATION UNIT
101: TRANSPORT VEHICLE INFORMATION GENERATION UNIT

102: TRANSPORT VEHICLE STARTING INSTRUCTION UNIT
110: RECORDING MEDIUM
2: LOADING VEHICLE
20: INFORMATION PROVISION DEVICE
20A: TERMINAL DEVICE
200: TRANSPORT VEHICLE INFORMATION ACQUISITION UNIT
201: TRANSPORT VEHICLE DESIGNATION RECEPTION UNIT
202: LOADING STATE DETERMINATION UNIT
203: LOAD CALCULATION UNIT
204: LOADING-PROGRESS-DEGREE CALCULATION UNIT
205: LOADING-PROGRESS-DEGREE TRANSMISSION UNIT
206: COMPLETION OPERATION RECEPTION UNIT
207: TERMINAL COMMUNICATION UNIT
208: DETERMINATION UNIT
210: RECORDING MEDIUM
3: TRANSPORT VEHICLE
30: TERMINAL DEVICE
4: VEHICLE WEIGHT METER
N: WIDE AREA NETWORK
F1: CONSTRUCTION SITE
F2: STANDBY PLACE
D1: TRANSPORT VEHICLE SELECTION SCREEN
D2: LOADING WORK SCREEN

The invention claimed is:

1. A loading work assistance system which gives, on the basis of information regarding loading work performed on a first transport vehicle located in a construction site by a loading vehicle, an instruction to a second transport vehicle standing by, the loading work assistance system comprising:
  a loading-progress-degree calculation unit that calculates a degree of progress of the loading work performed on the first transport vehicle located in the construction site by the loading vehicle;
  a determination unit that determines whether or not the calculated degree of progress is equal to or more than a degree-of-progress determination threshold value that is a value corresponding to more than 0% and less than 100% of a maximum load capacity of the first transport vehicle; and
  a transport vehicle starting instruction unit that instructs the second transport vehicle standing by to be started traveling in a case where the calculated degree of progress is equal to or more than the degree-of-progress determination threshold value.

2. The loading work assistance system according to claim 1, further comprising:
  a transport vehicle information acquisition unit that acquires a maximum load capacity of each of the transport vehicles,
  wherein the loading-progress-degree calculation unit calculates the degree of progress on the basis of the maximum load capacity.

3. The loading work assistance system according to claim 2,
  wherein the transport vehicle information acquisition unit further acquires an original load amount of each of transport vehicles, and
  wherein the loading-progress-degree calculation unit calculates the degree of progress on the basis of the maximum load capacity and the original load amount.

4. The loading work assistance system according to claim 3, further comprising:
  a load calculation unit that calculates a load of a transport object which is loadable onto the first transport vehicle through one loading operation,
  wherein the loading-progress-degree calculation unit calculates the degree of progress on the basis of an accumulated value of the load calculated every loading operation.

5. The loading work assistance system according to claim 2, further comprising:
  a load calculation unit that calculates a load of a transport object which is loadable onto the first transport vehicle through one loading operation,
  wherein the loading-progress-degree calculation unit calculates the degree of progress on the basis of an accumulated value of the load calculated every loading operation.

6. The loading work assistance system according to claim 1, further comprising:
  a load calculation unit that calculates a load of a transport object which is loadable onto the first transport vehicle through one loading operation,
  wherein the loading-progress-degree calculation unit calculates the degree of progress on the basis of an accumulated value of the load calculated every loading operation.

7. An information provision method of giving on the basis of information regarding loading work performed on a first transport vehicle located in a construction site by a loading vehicle, an instruction to a second transport vehicle standing by, the information provision method comprising the steps of:
  determining whether or not the loading vehicle is in a loading state with respect to the first transport vehicle which is a loading work target;
  calculating a degree of progress of the loading work performed on the first transport vehicle which is a loading work target by the loading vehicle in a case where the loading vehicle is in the loading state;
  determining whether or not the calculated degree of progress is equal to or more than a degree-of-progress determination threshold value that is a value corresponding to more than 0% and less than 100% of a maximum load capacity of the first transport vehicle; and
  instructing the second transport vehicle standing by to be started traveling in a case where the calculated degree of progress is equal to or more than the degree-of-progress determination threshold value.

8. An information provision method of giving on the basis of information regarding loading work performed on a first transport vehicle located in a construction site by a loading vehicle, an instruction to a second transport vehicle standing by, the information provision method comprising the steps of:
  receiving designation of the first transport vehicle which is a loading work target;
  determining whether or not the loading vehicle is in a loading state with respect to the designated first transport vehicle in a case where the designation of the first transport vehicle is received;
  calculating a degree of progress of loading work performed on the first designated transport vehicle by the loading vehicle in a case where the loading vehicle is in the loading state;
  determining whether or not the calculated degree of progress is equal to or more than a degree-of-progress determination threshold value that is a value corresponding to more than 0% and less than 100% of a maximum load capacity of the first transport vehicle; and instructing the second transport vehicle standing by to be started traveling in a case where the calculated degree of progress is equal to or more than the degree-of-progress determination threshold value.

* * * * *